United States Patent
Dorffer et al.

(10) Patent No.: US 8,881,808 B2
(45) Date of Patent: Nov. 11, 2014

(54) METHOD OF DETERMINING A VALUE INDICATIVE OF FRACTURE QUALITY

(71) Applicant: Halliburton Energy Services, Inc., Houston, TX (US)

(72) Inventors: Daniel F. Dorffer, Houston, TX (US); Weijun Guo, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 13/982,536

(22) PCT Filed: Nov. 26, 2012

(86) PCT No.: PCT/US2012/066505
§ 371 (c)(1),
(2), (4) Date: Jul. 30, 2013

(87) PCT Pub. No.: WO2014/081436
PCT Pub. Date: May 30, 2014

(65) Prior Publication Data
US 2014/0144622 A1    May 29, 2014

(51) Int. Cl.
*E21B 49/00* (2006.01)
*G01V 5/10* (2006.01)

(52) U.S. Cl.
CPC ............... *E21B 49/00* (2013.01); *G01V 5/101* (2013.01)
USPC ....... 166/250.1; 166/308.1; 702/8; 250/269.6

(58) Field of Classification Search
CPC ........ E21B 43/26; E21B 43/267; G01V 5/101

USPC ............... 166/250.1, 308.1; 702/8; 250/269.6
See application file for complete search history.

(56) References Cited

U.S. PATENT DOCUMENTS

| | | | |
|---|---|---|---|
| 3,817,328 A * | 6/1974 | Neuman | 376/166 |
| 4,926,940 A | 5/1990 | Stromswold | |
| 4,950,892 A | 8/1990 | Olesen | |
| 6,936,812 B2 * | 8/2005 | Odom et al. | 250/269.5 |
| 7,675,817 B2 * | 3/2010 | Moos | 367/73 |
| 8,044,342 B2 | 10/2011 | Galford et al. | |
| 8,100,177 B2 | 1/2012 | Smith, Jr. et al. | |

(Continued)

FOREIGN PATENT DOCUMENTS

WO     2013/012504 A2     1/2013

OTHER PUBLICATIONS

International Search Report and Written Opinion issued May 24, 2013 in International Application No. PCT/US2012/066505 filed Nov. 26, 2012.

(Continued)

*Primary Examiner* — Nicole Coy
(74) *Attorney, Agent, or Firm* — Mark E. Scott; Conley Rose, P.C.

(57) ABSTRACT

Determining a value indicative of fracture quality. At least some of the illustrative embodiments are methods including: obtaining or measuring gas saturation of a formation to create a value indicative of pre-fracture gas saturation; and after a fracturing process measuring gas saturation of the formation to create a value indicative of post-fracture gas saturation; and creating a value indicative of fracture quality based on the value indicative of pre-fracture gas saturation and the value indicative of post-fracture gas saturation.

27 Claims, 5 Drawing Sheets

(56) References Cited

U.S. PATENT DOCUMENTS

| | | | |
|---|---|---|---|
| 8,214,151 B2 * | 7/2012 | Duenckel et al. | 702/8 |
| 8,234,072 B2 | 7/2012 | Smith, Jr. et al. | |
| 8,346,481 B2 * | 1/2013 | Jacobson et al. | 702/8 |
| 8,692,185 B2 * | 4/2014 | Guo et al. | 250/269.4 |
| 2007/0108380 A1 | 5/2007 | Poe et al. | |
| 2009/0090505 A1 * | 4/2009 | McDaniel et al. | 166/250.1 |
| 2011/0282818 A1 * | 11/2011 | Chen et al. | 706/21 |
| 2012/0031613 A1 | 2/2012 | Green | |
| 2012/0059587 A1 * | 3/2012 | Marsh et al. | 702/8 |
| 2012/0080588 A1 | 4/2012 | Smith, Jr. et al. | |
| 2012/0197529 A1 * | 8/2012 | Stephenson et al. | 702/8 |
| 2013/0134304 A1 * | 5/2013 | Beekman et al. | 250/269.6 |
| 2013/0206972 A1 * | 8/2013 | Zhou et al. | 250/269.4 |

OTHER PUBLICATIONS

Duenckel, R.J. et al. Field Application of a New Proppant Detection Technology. SPE 146744. Society of Petroleum Engineers, 2011. SPE Annual Technical Conference and Exhibition; Denver, Colorado; Oct. 30-Nov. 2, 2011.

Guo, W. et al. Pulsed Neutron Tool Responses in Propped Fractures and Gravel-Packed Completions. Society of Petrophysicists and Well Log Analysts, 2007. SPWLA 48th Annual Logging Symposium; Austin, Texas; Jun. 3-6, 2007.

* cited by examiner

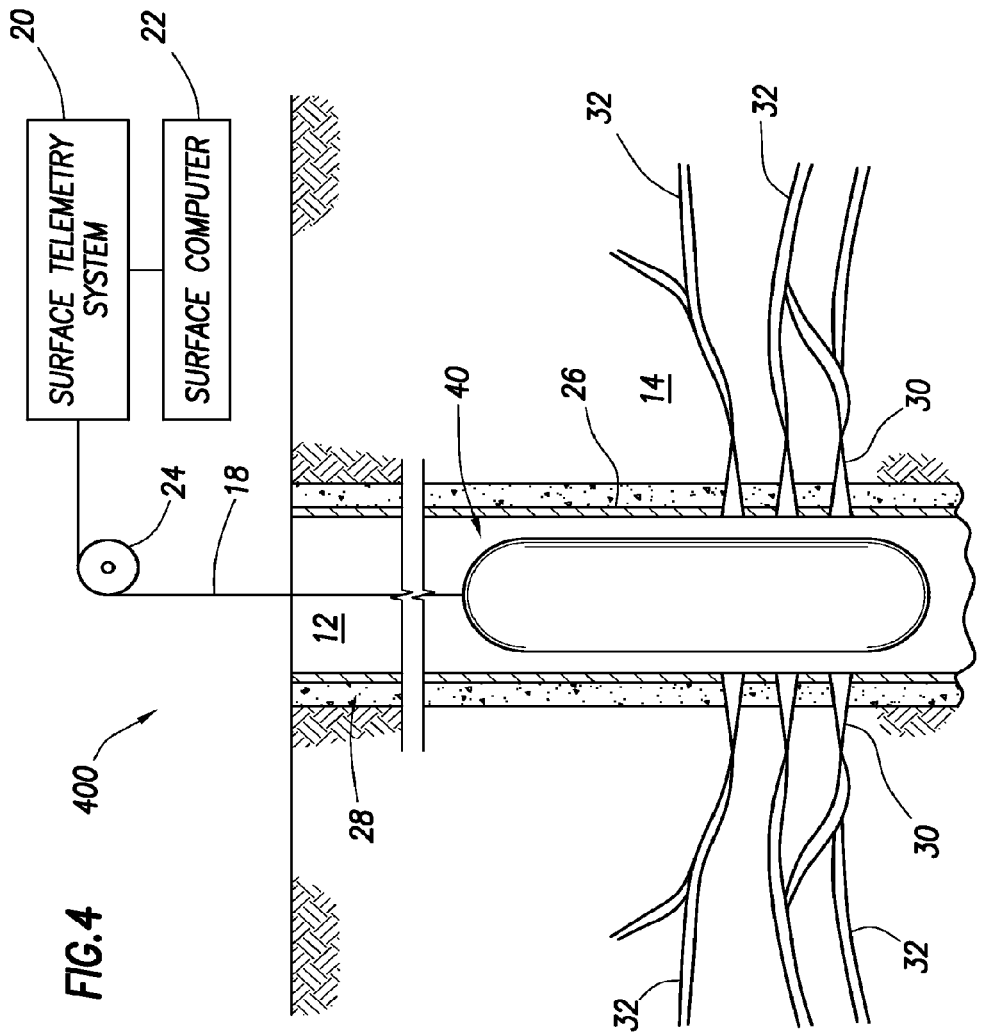

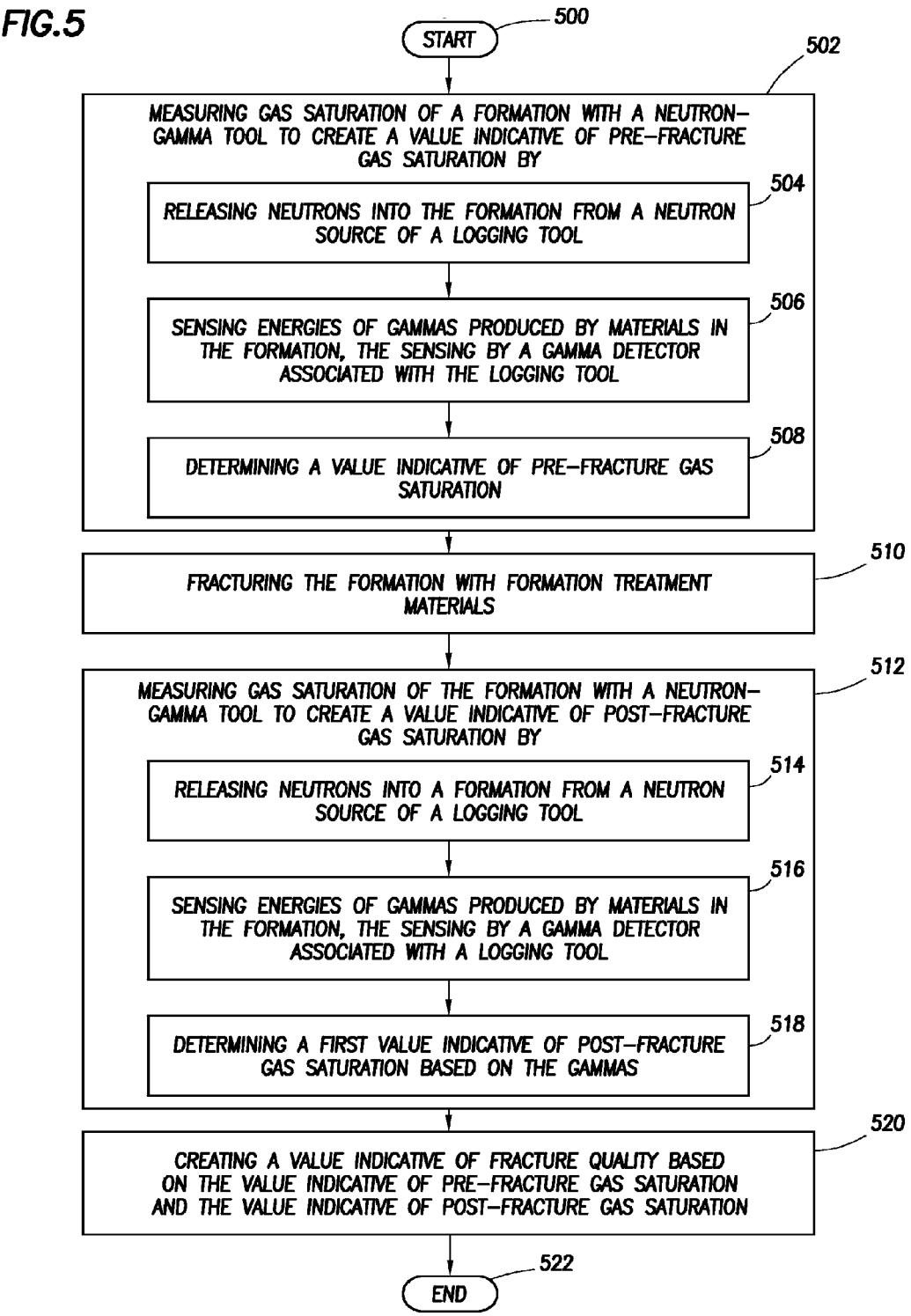

METHOD OF DETERMINING A VALUE INDICATIVE OF FRACTURE QUALITY

CROSS-REFERENCE TO RELATED APPLICATIONS

None.

BACKGROUND

In the realm of exploration and production of hydrocarbons from underground formations, fracturing (sometimes referred to as "fracking") is a technique where various treatment materials are pumped at high pressure into the formation. The high pressure tends to crack or fracture the formation, thus opening pathways for the hydrocarbons to more easily flow to the wellbore. In some cases, the treatment material may contain proppants which are believed to "prop open" the newly created flow pathways.

Within the industry, there are few mechanisms to rate the quality of a fracturing process. In general, fracture planning involves selecting a quantity of fluid, and in some cases a quantity of proppant material, to be pumped downhole. If the selected quantities are successfully pumped downhole without a "screen out" (i.e., a blockage of the perforations through the casing by the proppant material), then the fracture is considered a good fracture.

BRIEF DESCRIPTION OF THE DRAWINGS

For a detailed description of exemplary embodiments, reference will now be made to the accompanying drawings in which:

FIG. 4 shows a system (after fracturing) in accordance with at least some embodiments;

FIG. 5 shows a method in accordance with at least some embodiments; and

FIG. 6 shows a computer system in accordance with at least some embodiments.

NOTATION AND NOMENCLATURE

Figure 1:
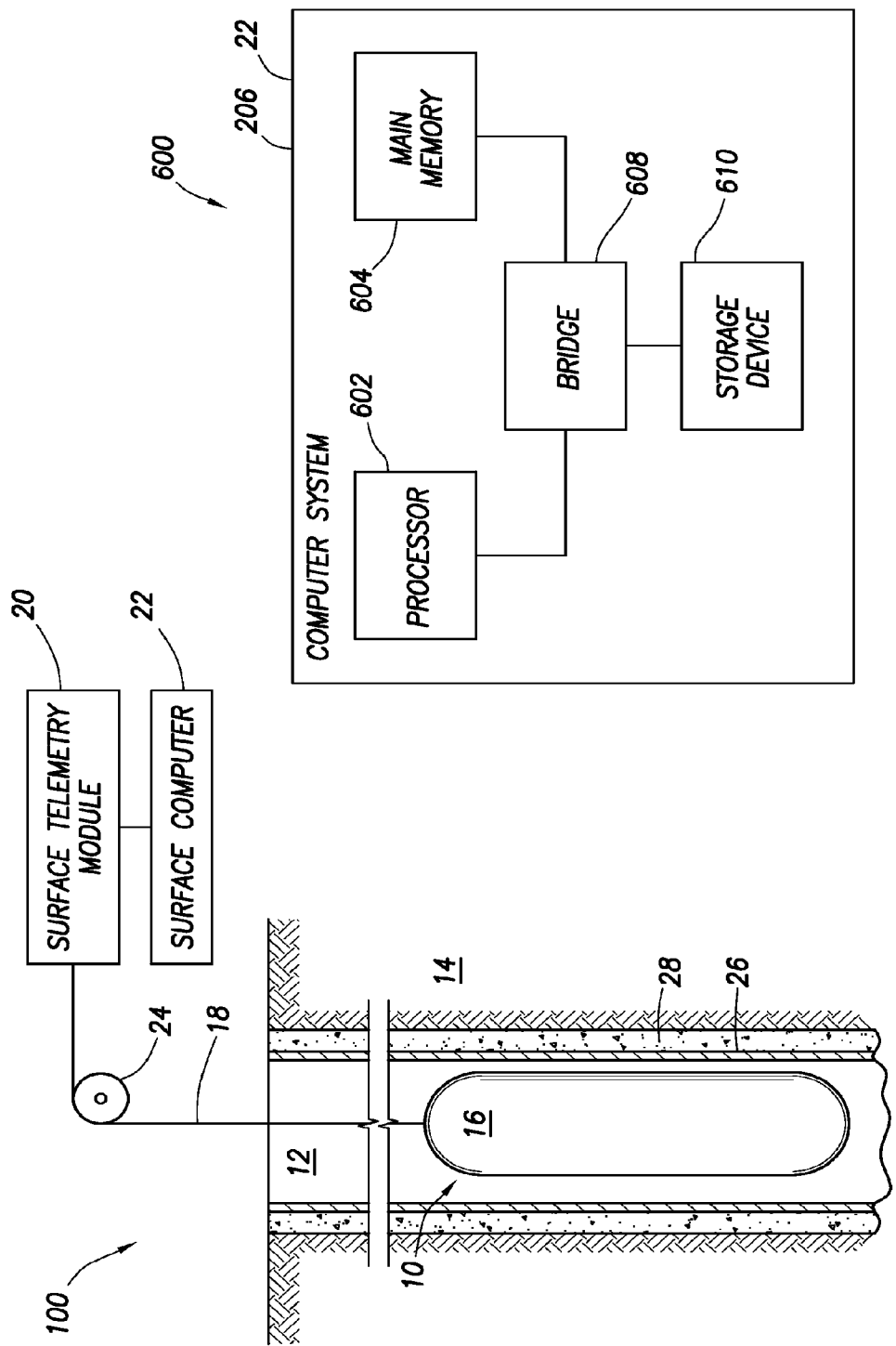
FIG. 1 shows a system (prior to fracturing) in accordance with at least some embodiments.

Certain terms are used throughout the following description and in the claims to refer to particular system components. As one skilled in the art will appreciate, oilfield service companies may refer to a component by different names. This document does not intend to distinguish between components that differ in name but not function.

In the following discussion and in the claims, the terms "including" and comprising" are used in an open-ended fashion, and thus should be interpreted to mean "including, but not limited to . . . . " Also, the term "couple" or "couples" is intended to mean either an indirect or direct connection. Thus, if a first device couples to a second device, that connection may be through a direct connection or through an indirect connection via other devices and connections.

"Gamma" or "gammas" shall mean energy created and/or released due to neutron interaction with atoms, and in particular atomic nuclei, and shall include such energy whether such energy is considered a particle (i.e., gamma particle) or a wave (i.e., gamma ray or wave).

"Gamma count rate decay curve" shall mean, for a particular gamma detector, a plurality of count values, each count value based on gammas counted during a particular time bin and/or having particular energy. The count values may be adjusted up or down to account for differences in the number of neutrons giving rise to the gammas or different tools, and such adjustment shall not negate the status as a "gamma count rate decay curve."

"Inelastic count rate" shall mean a gamma count rate during periods of time when gammas created by inelastic collisions are the predominant gammas created and/or counted (e.g., during the neutron burst period). The minority presence of counted capture gammas shall not obviate a count rate's status as an inelastic count rate.

"Capture count rate" shall mean a gamma count rate during periods of time when gammas created by thermal neutron capture are the predominant gammas created and/or counted (e.g., periods of time after the neutron burst period). The minority presence of counted inelastic gammas shall not obviate a count rate's status as capture count rate.

"Spacing", as between a neutron source and a gamma detector, shall mean a distance measured from a geometric center of the neutron source to a geometric center of a scintillation crystal of the gamma detector.

"Releasing neutrons" shall mean that neutrons travel away from a source of neutrons, but shall not speak to the mechanism by which the neutrons are created (e.g., particle collisions, radioactive decay).

"Radioactive elements" shall mean the elements that naturally decay, and where the elements have isotopic ratios that are not naturally occurring.

"Substantially free of radioactive elements" shall mean the recited materials are not present, except as impurities in other constituents.

"Radiation activated elements" shall mean elements that are stable, and that when activated by neutron interaction the elements become radioactive. Elements that emit prompt gammas within 1 millisecond of interaction with a neutron shall not be considered "radiation activated elements."

"Substantially free of radiation activated elements" shall mean the recited materials are not present, except as impurities in other constituents.

DETAILED DESCRIPTION

The following discussion is directed to various embodiments of the invention. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

The various embodiments were developed in the context of wireline logging tools, and thus the description that follows is based on the developmental context; however, the various methods find application not only with wireline logging tools, but also "slickline" tools, in which the logging tool is placed downhole (e.g., as a standalone device), and the logging tool gathers data that is stored in a memory within the device (i.e., not telemetered to the surface). Once the tool is brought back to the surface the data is downloaded, some or all the processing takes place, and the logging data is printed or otherwise displayed. Thus, the developmental context shall not be construed as a limitation as to the applicability of the various embodiments.

Within the oil and gas industry, there are few mechanisms to rate the quality of a fracturing process, and even the few mechanisms are only loosely related to fracture quality. For example, in the related-art a fracturing process is considered successful if the planned volume of treatment fluid and planned volume of treatment proppants are successfully pumped downhole without a "screen out." Beyond successfully pumping of the treatment materials, no other indication of quality may be determined. In other cases, the treatment materials (e.g., the fluid, and/or the proppant) may contain either radioactive elements, or radiation activated elements. After a fracturing process the physical distance that the radioactive materials have traveled into the formation may be measured, and such a measurement may be considered an indication of fracture quality. However, use of such radioactive and/or radiation activated elements in the treatment materials has several drawbacks. Firstly, there is a perceived negative environmental impact of using radioactive elements (whether inherently radioactive, or activated to be radioactive). Secondly, the radioactive elements have half-lives on order of hours to a few days, and thus there is a limited amount of time after the fracture within which the travel distance may be measured. Moreover, the distance a radioactive element travels is not necessarily indicative of how well the formation was fractured. That is, while the treatment fluid and the proppant may move along pre-existing permeability of the formation based on the fracturing pressure applied, such movement is not necessarily indicative of how many additional flow pathways were opened by the fracturing pressure.

Moreover, the physical state of formation after a fracture is not necessarily static. That is, over time the naturally occurring fracture pathways for gas flow, as well as the fracture pathways created during the fracturing process, may tend to close (e.g., loss of pressure causing collapse of the flow pathways, sand migration blocking or clogging the flow pathways). The volume of treatment materials successfully pumped into the formation at the time of fracture may have no relationship to later closing of fracture pathways. What is more, the time frame for the closure of the pathways may be on the order of weeks or months, and thus the radioactive elements and/or radiation activated elements may not be useful weeks or months later. Even if the radioactive and/or radiation activated elements are still useable, there is no guarantee that there is a correlation between such materials and the later closing and/or blockage of fracture pathways—the radioactive elements and/or the radiation activated elements may remain lodged in place yet the formation still experience closure and/or blockage.

The various embodiments are directed to methods of calculating a value indicative of fracture quality, where the fracture quality is based (at least in part) on gas saturation of the formation after the fracturing process. More particularly, at least some embodiments are directed to measuring gas saturation prior to the fracturing processing, and then measuring gas saturation after the fracturing process. The value indicative of gas saturation is thus created based on the measured gas saturation(s). In some example methods, the measurement of gas saturation prior to the fracture may be omitted, and the pre-fracture gas saturation may be estimated based on, for example, formation type, measurements of closely related formations (e.g., close distance, same type formation), and/or models of pre-facture gas saturation. As measurements of gas saturation can be accurately made without the use of radioactive and/or radiation activated elements, the fracturing process need not use such materials.

While the inventors do not wish to be tied to any particular physical mechanism that relates gas saturation and fracture quality, one theory of the relationship of gas saturation to fracture quality is that if a fracturing process successfully opens a significant number of new gas flow pathways to the wellbore, such new gas flow pathways will then fill with hydrocarbons (such as natural gas). Thus, an increase in gas saturation (with respect to the gas saturation prior to fracture) is indicative of the quality of the fracturing process. The specification now turns to example systems.

FIG. 1 illustrates a logging system 100 constructed in accordance with a least some embodiments. In particular, FIG. 1 shows a logging tool 10 placed within a borehole 12 proximate to a formation 14 of interest. In the illustrative case of FIG. 1, the borehole 12 comprises a casing 26 with cement 28 between the casing 26 and the borehole wall. Thus, FIG. 1 is illustrative of a borehole that has been drilled and cased, but where the casing has yet to be perforated and the formation has yet to be fractured. The example logging tool 10 comprises a pressure vessel 16 within which various subsystems of the logging tool reside, and in the illustrative case of FIG. 1 the pressure vessel 16 is suspended within the borehole 12 by a cable 18. Cable 18, in some embodiments a multi-conductor armored cable, not only provides support for the pressure vessel 16, but also in these embodiments communicatively couples the logging tool 10 to a surface telemetry module 20 and a surface computer 22. The tool 10 may be raised and lowered within the borehole 12 by way of the cable 18, and the depth of the tool 10 within the borehole 12 may be determined by depth measurement system 24 (illustrated as a depth wheel).

In accordance with example methods, the logging tool 10 is a pulsed-neutron tool that interrogates the formation with neutrons, and receives gammas at the tool, the gammas created based on interaction of the neutrons with elements of the formation. Thus, the example logging tool 10 may be referred to as a neutron-gamma tool.

Figure 2:
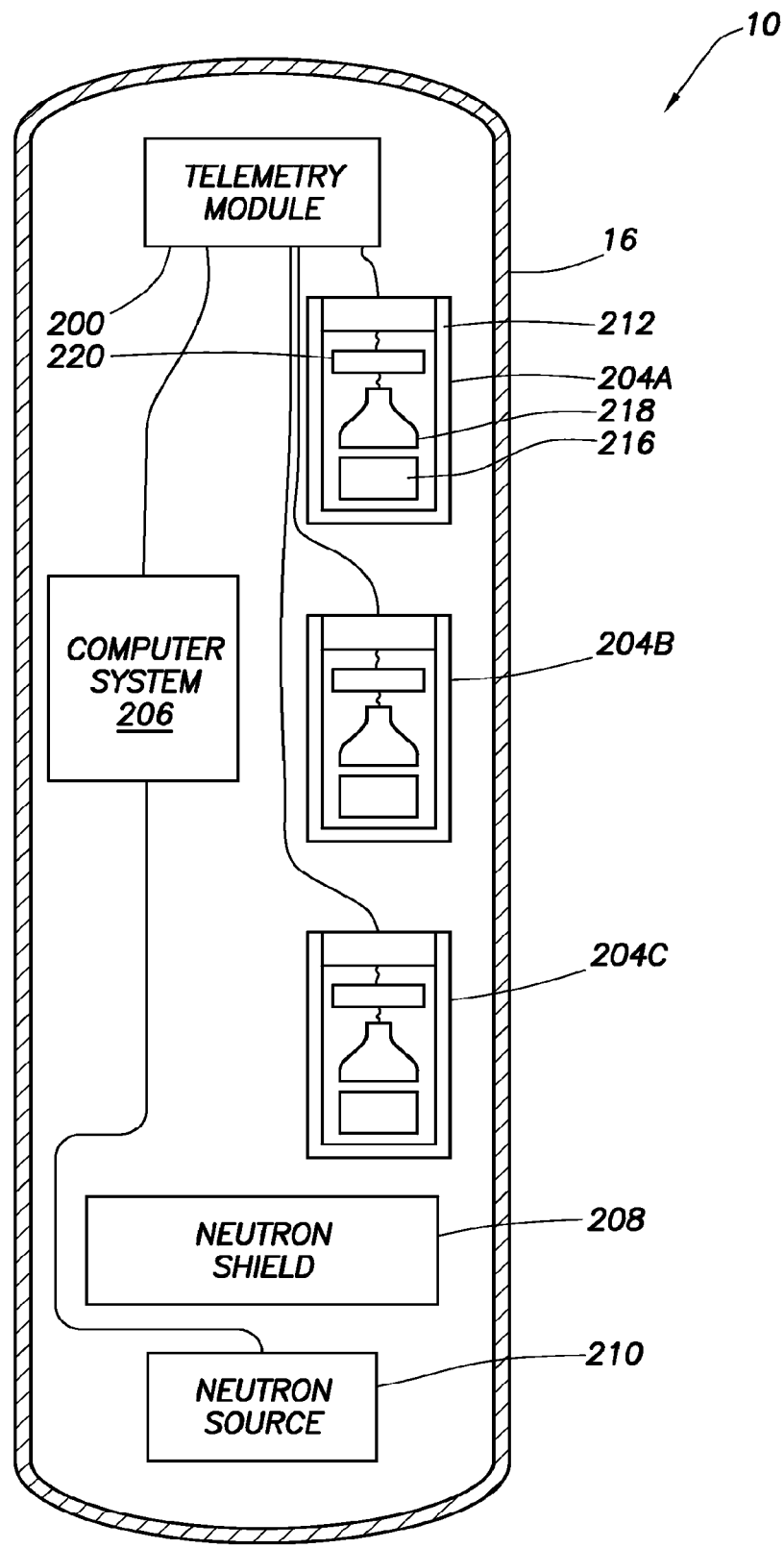
FIG. 2 shows a simplified cross-sectional view of a logging tool in accordance with at least some embodiments.

FIG. 2 shows a simplified cross-sectional view of the logging tool 10 to illustrate the internal components in accordance with at least some embodiments. In particular, FIG. 2 illustrates that the pressure vessel 16 houses various components, such as a telemetry module 200, a plurality of gamma detectors 204 (in this illustrative case three gamma detectors labeled 204A, 204B and 204C), computer system 206, a neutron shield 208, and a neutron source 210. While the gamma detectors 204 are shown above the neutron source 210, in other embodiments the gamma detectors may be below the neutron source 210. Gamma detector 204C may be on the order of 12 inches from the neutron source 210. The gamma detector 204B may be on the order of 24 inches from the neutron source 210. The gamma detector 204A may be on the order of 32.5 to 36 inches from the neutron source 210. Other spacing may be equivalently used.

In some embodiments the neutron source 210 is a Deuterium/Tritium neutron generator. However, any neutron source capable of producing and/or releasing neutrons with sufficient energy (e.g., greater than 8 Mega-Electron Volt (MeV)) may be equivalently used. The neutron source 210, under command from surface computer 22 in the case of wireline tools, or computer system 206 within the tool in the case of slickline tools, generates and/or releases energetic neutrons. In order to reduce the neutron exposure of the gamma detectors 204 and other devices by energetic neutrons from the neutron source 210, a neutron shield 208 (e.g., HEVIMET® available from General Electric Company of Fairfield, Conn.) may separate the neutron source 210 from the gamma detectors 204.

Because of the speed of the energetic neutrons (e.g., 30,000 kilometers/second or more), and because of collisions of the neutrons with atomic nuclei that change the direction of movement of the neutrons, a neutron flux is created around the logging tool 10 that extends into the formation 14. Neutrons generated and/or released by the source 210 interact with atoms by way of inelastic collisions and/or thermal capture. In the case of inelastic collisions, a neutron inelastically collides with atomic nuclei, a gamma is created (an inelastic gamma), and the energy of the neutron is reduced. The neutron may have many inelastic collisions with the atomic nuclei, each time creating an inelastic gamma and losing energy. At least some of the gammas created by the inelastic collisions are incident upon the gamma detectors 204. One or both of the arrival time of a particular gamma and its energy may be used to determine status as an inelastic gamma.

After one or more inelastic collisions (and corresponding loss of energy) a neutron reaches an energy known as thermal energy (i.e., a thermal neutron). At thermal energy a neutron can be captured by atomic nuclei. In a capture event, the capturing atomic nucleus enters an excited state, and the nucleus later transitions to a lower energy state by release of energy in the form of a gamma (known as a thermal gamma). At least some of the thermal gammas created by thermal capture are also incident upon the gamma detectors 204. One or both of the arrival time of a particular gamma and its energy may be used to determine its status as a capture gamma. Only inelastic and thermal capture interactions produce gammas, however.

Still referring to FIG. 2, when operational the gamma detectors 204 detect arrival and energy of gammas. Referring to gamma detector 204A as indicative of all the gamma detectors 204, a gamma detector comprises an enclosure 212, and within the enclosure 212 resides: a crystal 216 (e.g., yttrium/gadolinium silicate scintillation crystal or a bismuth germinate (BGO) scintillation crystal); a photo multiplier tube 218 in operational relationship to the crystal 216; and a processor 220 coupled to the photomultiplier tube 218. As gammas are incident upon/within the crystal 216, the gammas interact with the crystal 216 and flashes of light are emitted. Each flash of light itself is indicative of an arrival of a gamma, and the intensity of light is indicative of the energy of the gamma. The output of the photomultiplier tube 218 is proportional to the intensity of the light associated with each gamma arrival, and the processor 220 quantifies the output as gamma energy and relays the information to the surface computer 22 (FIG. 1) by way of the telemetry module 200 in the case of a wireline tool, or to the computer system 206 within the tool in the case of a slickline tools.

Figure 3:
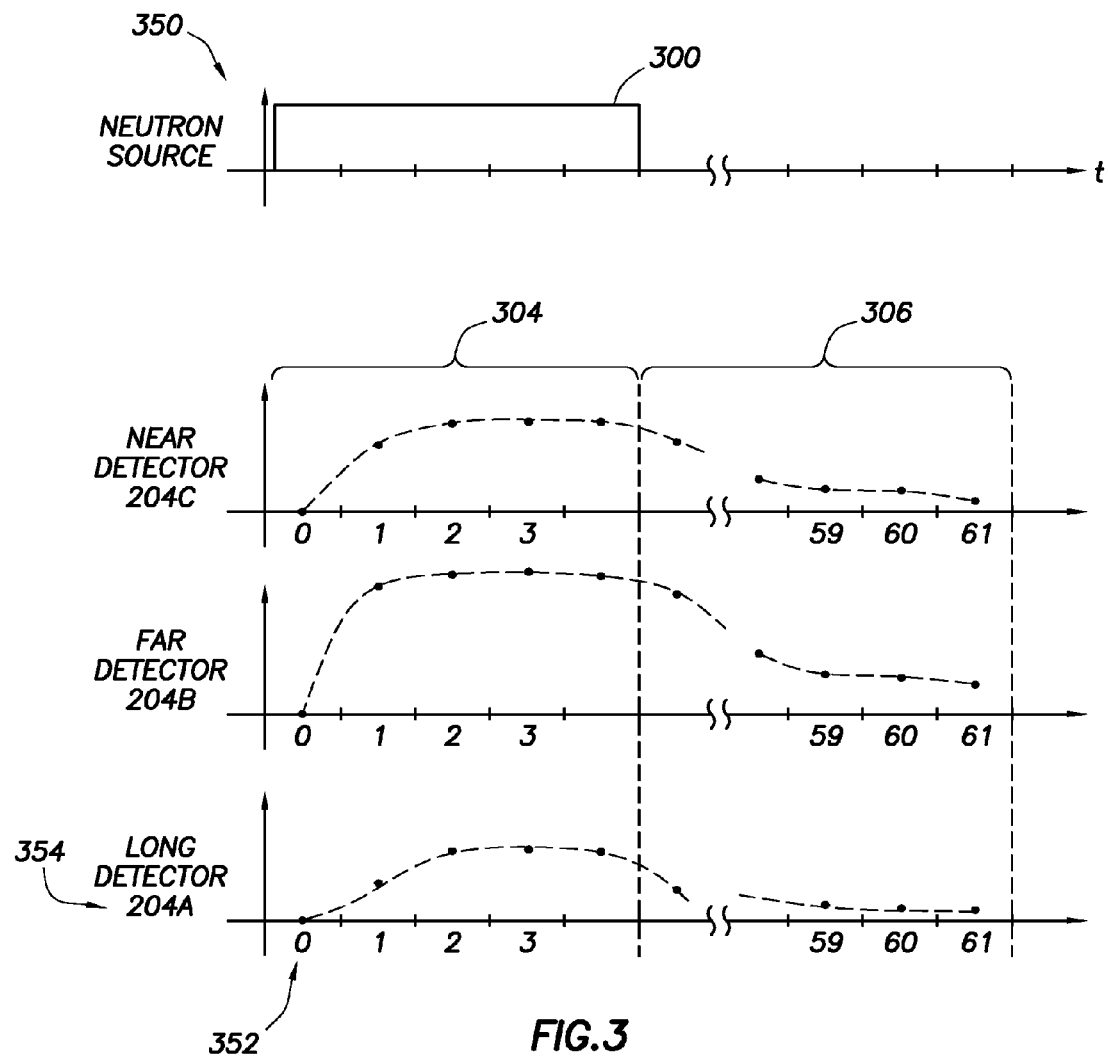
FIG. 3 shows a plurality of graphs of count rate as a function of time in accordance with at least some embodiments.

FIG. 3 shows a plurality of graphs as a function of corresponding time in order to describe how the gamma arrivals are recorded and characterized in accordance with at least some embodiments. In particular, FIG. 3 shows a graph 350 relating to activation of the neutron source 210, as well as gamma count rates for the example near detector 204C, the far detector 204B, and the long detector 204A. The graph 350 with respect to the neutron source 210 is Boolean in the sense that it shows when the neutron source 210 is generating and/or releasing neutrons (i.e., the burst period), and when the neutron source 210 is not. In particular, with respect to the neutron source graph 350 the neutron source 210 is generating and/or releasing neutrons during the asserted state 300, and the neutron source 210 is off during the remaining time. In accordance with the various embodiments, a single interrogation (at a particular borehole depth) comprises activating the neutron source 210 for a predetermined amount of time (e.g., 80 microseconds (µs)) and counting the number of gamma arrivals by at least one of the detectors during the activation time of the neutron source and for a predetermined amount of time after the source is turned off. In at least some embodiments, the total amount of time for a single interrogation (i.e., a single firing of the neutron source and the predetermined amount of time after the neutron source is turned off) may span approximately 1250 µs, but other times may be equivalently used.

Still referring to FIG. 3, with respect to counting gamma arrivals by the gamma detectors 204, in example systems interrogation time is divided into a plurality of time slots or time bins 352. With reference to the graph 354 for the long detector 204A as illustrative of all the gamma detectors, in some embodiments the interrogation time is divided into 61 total time bins. In example systems, the first 32 time bins each span 10 µs, the next 16 time bins each span 20 µs, and the remaining time bins each span 50 µs. Other numbers of time bins, and different time bin lengths, may be equivalently used. Each gamma that arrives within a particular time bin increases the count value of gammas within that time bin. While in some embodiments the actual arrival time of the gammas within the time bin may be discarded, in other embodiments the actual arrival may be retained and used for other purposes. Moreover, while in some embodiments the recorded energy of the gammas may be discarded, in other embodiments the energies may be retained and used for other purposes.

In the example system, starting with time bin 0, the gamma detector counts the gamma arrivals and increases the count value for the particular time bin for each gamma arrival. Once the time period for the time bin expires, the system starts counting anew the arrivals of gammas within the next time bin until count values for all illustrative 61 time bins have been obtained. In some cases, the system starts immediately again by activating the neutron source and counting further time bins; however, the count values within each time bin (for a particular borehole depth) are recorded either by way of the surface computer 22 in the case of wireline tools, and/or by the computer system 206 within the tool in the case of slickline tools.

Illustrative count values for each time bin are shown in FIG. 3 as dots in the center of each time bin. The count value for each time bin is represented by the height of the dot above the x-axis (i.e., the y-axis value). Taking all the count values for a particular detector together, the dots may be connected by an imaginary line (shown in dashed form in FIG. 3) to form a mathematical curve illustrative of the number of gamma arrivals as a function of time detected by the particular gamma detector. In accordance with the various embodiments, the plurality of count values is referred to as a gamma count rate decay curve. All the curves taken together (the curve for each gamma detector) may be referred to as full-set decay curves.

Because of the physics of the combined logging tool and surrounding formation, within certain time periods certain types of gammas are more likely to be created, and thus more likely to be counted by the one or more gamma detectors 204. For example, during the period of time within which the neutron source 210 is activated (as indicated by line 300), the energy of neutrons created and/or released leads predominantly to creation of inelastic gammas. The period of time in the gamma count rate decay curves where the gammas are predominantly inelastic gammas is illustrated by time period 304. Thus, gammas counted during some or all of the time period 304 may be considered inelastic gammas, and the count rate may be referred to as an inelastic count rate. Some capture gammas may be detected during the time period 304, and in some embodiments the minority presence of capture gammas may be ignored. In yet still other embodiments, because capture gammas are distinguishable from inelastic gammas based on energy, and because the gamma detectors not only detect arrival of a gamma but also energy, the portion of the count rate during time period 304 attributable to capture gammas may be removed algorithmically.

Similarly, after the neutron source 210 is no longer activated, the average energy of the neutrons that make up the neutron flux around the tool 110 decreases, and the lower energy of the neutrons leads predominantly to creation of capture gammas. The period of time in the gamma count rate decay curves where the gammas are predominantly capture gammas is illustrated by time period 306. Thus, gammas counted during some or all of the time period 306 may be considered capture gammas, and the count rate may be referred to as a capture count rate. Some inelastic gammas may be detected during the time period 306, and in some embodiments the minority presence of inelastic gammas may be ignored. In yet still other embodiments, because inelastic gammas are distinguishable from capture gammas based on energy, the portion of the count rate during time period 306 attributable to inelastic gammas may be removed algorithmically.

In some example systems, a single gamma count rate decay curve may be used to determine a value indicative of gas saturation. For example, in some cases a value indicative of gas saturation may be determined based on the ratio of inelastic count rate and capture count rate from a single gamma detector (e.g., gamma detector 204C). Thus, in some systems the tool 10 may have only a single gamma detector. Determining a value indicative of gas saturation based on ratios of inelastic count rate and capture count rate from a single gamma detector is described in commonly-owned and co-pending applications PCT/US12/42869 filed Jun. 18, 2012 titled "Method and system of determining a value indicative of gas saturation of a formation" and U.S. application Ser. No. 12/812,652 filed Jul. 13, 2010 titled "Method and system of determining a value indicative of gas saturation of a formation". In yet still other cases, the value indicative of gas saturation may be determined based on readings from two or more gamma detectors, such as the neural network-based determinations described in U.S. application Ser. No. 13/146,437 filed Jul. 27, 2011 titled "System and method of predicting gas saturation of a formation using neural networks." Determining a value indicative of gas saturation within the energy domain (i.e., based on arrival energies in addition to or in place of arrival count rates) may also be used. The discussion now turns to determining a value indicative of gas saturation after the fracturing process.

FIG. 4 illustrates the logging system 400 associated with the borehole 12 after a fracturing process. In particular, the logging system 400 is placed in the borehole 12 after the casing 26 and the cement 28 are perforated 30. Fracturing techniques utilizing various formation treatment materials, such as a fracturing fluid, an acidizing fluid and/or a proppant, are used to create and/or increase the size of the fractures 32 in the formation 14. For example, fracturing fluids may be injected into the formation 14 at high pressures to fracture open the formation 14, acids used to increase the size of the fractures, and/or proppants carried with the fracturing fluids into the fractures 32 keep the fractures 32 propped open after pressure is released.

In accordance with various embodiments, the logging system 400 determines a value indicative of gas saturation of the formation 14 after the fracturing process (i.e., post-fracture). In particular, system 400 comprises a logging tool 40 disposed within the borehole 12. As implied by the figure, the logging tool used to determine the value indicative of post-fracture gas saturation need not be the same logging tool 10 that determines the value indicative of gas saturation prior to the fracturing process; however, in other cases the logging tools may be one in the same.

In accordance with example embodiments, creating the value indicative of fracture quality is based on the value indicative of post-fracture gas saturation and a value indicative of pre-fracture gas saturation. For example, in some example embodiments, the value indicative of fracture quality may be created using the following equation:

$$FQ_D = \frac{\text{POST-}FRACTURE_D}{\text{PRE-}FRACTURE_D} \quad (1)$$

where $FQ_D$ is the value indicative of fracture quality for a particular borehole depth (D), POST-FRACTURE is the value indicative of post-fracture gas saturation at the particular borehole depth, and PRE-FRACTURE is the value indicative of pre-fracture gas saturation at the particular borehole depth. The PRE-FRACTURE value may be: a gas saturation determined during drilling with a logging-while-drilling (LWD) tool; a gas saturation determined by way of a wireline or slickline tool prior setting the casing; a gas saturation determined by way of a wireline or slickline tool after setting the casing; a gas saturation of a related formation (e.g., physically or geologically related); or a gas saturation estimated by a model. Thus, in some cases the value indicative of fracture quality is based on a ratio of the value indicative of pre-fracture gas saturation and the value indicative of post-fracture gas saturation.

The example value indicative of fracture quality given by equation (1) is at a particular borehole depth; however, a fracturing operation may span an axial length of the borehole from a few feet (e.g., for vertically oriented boreholes) to thousands of feet (e.g., for horizontal boreholes in a shale formation). In some cases the value indicative of fracture quality over a plurality of borehole depths may be plotted on a plot or graph to show fracture quality as function of depth. In some cases the oilfield service company may want to provide, and/or the operator of the field may request, a single value indicative of the overall fracture quality. Thus, in yet still other cases determining the value indicative of fracture quality may involve combining the values indicative of fracture quality over a range of depth values. For example, in some cases an overall value indicative of fracture quality may be created using the following equation:

$$FQ_I = \frac{\sum_{D_1}^{D_2} FQ_D}{DPI} \quad (2)$$

where $FQ_I$ is the value indicative of fracture quality over the depth interval I, $D_i$ is a range of borehole depths that span interval I, $FQ_D$ is the value indicative of fracture quality for a depth D, and DPI is the number of discrete values indicative of fracture quality in the interval I. Inasmuch as the $FQ_D$ values may be given by equation (1) above, here again the value indicative of fracture quality (over the interval) is based on a ratio of the value indicative of pre-fracture gas saturation and the value indicative of post-fracture gas saturation.

Determining the value indicative of fracture quality based on a ratio of the pre- and post-fracture gas saturations of equation (1) is merely an example. Other values indicative of fracture quality based on one or more values indicative of gas saturation may be implemented. For example, in other cases the value indicative of fracture quality may be based on a difference between the pre- and post-fracture gas saturations values, such as by the following equation:

$$FQ_D = (POST\text{-}FRACTURE_D) - (PRE\text{-}FRACTURE_D) \quad (3)$$

where $FQ_D$ is the value indicative of fracture quality for a particular borehole depth (D), POST-FRACTURE is the value indicative of post-fracture gas saturation at the particular borehole depth, and PRE-FRACTURE is the value indicative of pre-fracture gas saturation at the particular borehole depth. As before, the PRE-FRACTURE value may be: a gas saturation determined during drilling with a logging-while-drilling (LWD) tool; a gas saturation determined by way of a wireline or slickline tool prior setting the casing; a gas saturation determined by way of a wireline or slickline tool after setting the casing; a gas saturation of a related formation (e.g., physically or geologically related); or a gas saturation estimated by model. Thus, in some cases the value indicative of fracture quality is based on a difference between ratio of the value indicative of pre-fracture gas saturation and the value indicative of post-fracture gas saturation. Moreover, a value indicative of fracture quality over an interval may be calculated using equation (2) above.

The example calculations used to create the value indicative of fracture quality have been based primarily on pre- and post-fracture gas saturations at particular borehole depths. However, in yet still other cases the values indicative of gas saturation over an interval may be combined, and the combined value used to create a value indicative of fracture quality over the interval. For example, in further cases the value indicative of fracture quality may be created using the following equation:

$$FQ_I = \frac{AVG(POST\text{-}FRACTURE_D)}{AVG(PRE\text{-}FRACTURE_D)} \quad (4)$$

where $FQ_I$ is the value indicative of fracture quality over the depth interval I, AVG( ) signifies an averaging operation of values within the parentheticals, POST-FRACTURE$_D$ is a series of values indicative of post-fracture gas saturation at a plurality of borehole depths D, and PRE-FRACTURE is a series of values indicative of pre-fracture gas saturation at a plurality of borehole depths D.

The example methods discussed to this point have been directed to determining a value indicative of fracture quality; however, even if assumed that a fracturing operation was successful (and the success is verified using one of the methods above), over time the fractures created in a formation may tend to close, either by loss of supporting pressure as the hydrocarbons are extracted and/or by sand and other fine particles migrating to and blocking the fractures (i.e., "sanding in"). Thus, an operator may be interested in determining how much the fracture quality has changed over time.

In example systems, a value indicative of fracture quality may be determined somewhat contemporaneously with the fracturing process. However, at point later in time (e.g., a week later, more than three weeks later), another value indicative of fracture quality may be determined, and using the various values indicative of gas saturation (e.g., one pre-fracture gas saturation, and two post-fracture gas saturations) the system may be able to create a value indicative of change of fracture quality. For example, a first value indicative of fracture quality may be created based on the first value indicative of post-fracture gas saturation, a second value indicative of fracture quality may be created based on the second value indicative of post-fracture gas saturation, and the change in fracture quality created based on the two values indicative of fracture quality (e.g., a ratio, a difference). In some cases, the same logging tool may be used to create all three values indicative of gas saturation (i.e., one pre-fracture, and two post-fracture), but in other cases different logging tools may be used. Moreover, as discussed, the pre-fracture gas saturation need not be a physically measured parameter, and instead may be derived from any of the previously discussed sources. The value indicative of change in fracture quality may be a function of borehole depth that is extended over the interval of interest, or the value indicative of change of fracture quality may be based on combinations of average values over the interval.

The various embodiments discussed to this point have implicitly assumed that the values indicative of fracture quality (or change in fracture quality) are determined by a logging system contemporaneously with measuring the value(s) indicative of post-fracture gas saturation. However, in other embodiments determining the values indicative of fracture quality (or change in fracture quality) may take place non-contemporaneously with a logging tool measuring the value(s) indicative of post-fracture gas saturation. Stated otherwise, the embodiments of determining a value indicative of the gas saturation (or change in fracture quality) may take place with respect to historical logging data gathered hours, days, weeks or months in advance of the calculating.

FIG. 5 illustrates a method (some of which may be carried out by software) in accordance with at least some embodiments. In particular, the method starts (block 500) and comprises: measuring gas saturation of a formation with a neutron-gamma tool to create a value indicative of pre-fracture gas saturation (block 502); fracturing the formation with formation treatment materials (block 510); measuring gas saturation of the formation with a neutron-gamma tool to create a value indicative of post-fracture gas saturation (block 512); and creating a value indicative of fracture quality based on the value indicative of pre-fracture gas saturation and the value indicative of post-fracture gas saturation (block 520). Thereafter, the method ends (block 522), in many cases to be immediately restarted.

In example situations, measuring gas saturation to create the value indicative of pre-fracture gas saturation (again, block 502) may comprise: releasing neutrons into the formation from a neutron source of a logging tool, the releasing by the logging tool prior to fracture of the formation (block 504); sensing energies of gammas produced by materials in the formation, the sensing by a gamma detector associated with the logging tool (block 506); and determining a value indicative of pre-fracture gas saturation (block 508). It is noted that in some situations the measuring gas saturation to create the value indicative of pre-fracture gas saturation may be omitted in favor of using other related values, as discussed above.

Measuring gas saturation of the formation with the neutron-gamma tool to create a value indicative of post-fracture gas saturation (again block 512) may comprise: releasing neutrons into a formation from a neutron source of a logging tool, the formation fractured prior to releasing the neutrons (block 514); sensing energies of gammas produced by materials in the formation, the sensing by a gamma detector associated with a logging tool (block 516); and determining a first value indicative of post-fracture gas saturation based on the gammas (block 518).

FIG. 6 illustrates in greater detail a computer system 600, which is illustrative of both the surface computer system 22 and the computer system 206 within the logging tool 10. Thus, the computer system 600 described with respect to FIG. 6 could be proximate to the borehole during the time period within the tool 10 is within the borehole, the computer system 600 could be located at the central office of the oilfield services company, or the computer system 600 could be within the logging tool 10. The computer system 600 comprises a processor 602, and the processor couples to a main memory 604 by way of a bridge device 608. Moreover, the processor 602 may couple to a long term storage device 610 (e.g., a hard drive) by way of the bridge device 608. Programs executable by the processor 602 may be stored on the storage device 610, and accessed when needed by the processor 602. The programs stored on the storage device 610 may comprise programs to implement the various embodiments of the present specification, including programs to implement measuring gas saturations, and calculating values indicative of fracture quality (and change of fracture quality). In some cases, the programs are copied from the storage device 610 to the main memory 604, and the programs are executed from the main memory 604. Thus, both the main memory 604 and storage device 610 are considered computer-readable storage mediums, and other examples are flash memory drives, optical discs, and magnetic disks. The values indicative of fracture quality and/or change in fracture quality created by the computer system 610 may be sent to a plotter that creates a paper-log, or the values may be sent to a display device which may make a representation of the log for viewing by a geologist or other person skilled in the art of interpreting such logs.

From the description provided herein, those skilled in the art are readily able to combine software created as described with appropriate general-purpose or special-purpose computer hardware to create a computer system and/or computer sub-components in accordance with the various embodiments, to create a computer system and/or computer sub-components for carrying out the methods of the various embodiments, and/or to create a non-transitory computer-readable storage medium (i.e., other than an signal traveling along a conductor or carrier wave) for storing a software program to implement the method aspects of the various embodiments.

References to "one embodiment," "an embodiment," "some embodiments," "particular embodiments", "various embodiments", "example methods", "example systems", or the like indicate that a particular element, characteristic, or step is included in at least one embodiment of the invention. Although the phrases may appear in various places, the phrases do not necessarily refer to the same embodiment.

The above discussion is meant to be illustrative of the principles and various embodiments of the present invention. Numerous variations and modifications will become apparent to those skilled in the art once the above disclosure is fully appreciated. For example, while example embodiments discuss determining a value indicative of pre-fracture gas saturation in cased borehole, the value indicative of pre-fracture saturation may be determined in an uncased borehole by way of a wireline or slickline tool, and in other cases determined by tools coupled within a drill string as the drill string creates the borehole. It is intended that the following claims be interpreted to embrace all such variations and modifications.

We claim:

1. A method comprising:
   determining a value indicative of fracture quality by:
   releasing neutrons into a formation from a neutron source of a first logging tool, the formation fractured prior to releasing the neutrons;
   sensing energies of gammas produced by materials in the formation, the sensing by a gamma detector associated with the first logging tool;
   determining a first value indicative of post-fracture gas saturation based on the gammas; and
   creating the value indicative of fracture quality based on the first value indicative of post-fracture gas saturation.

2. The method of claim 1 further comprising:
   releasing neutrons into the formation from a neutron source of a second logging tool, the releasing by the second logging tool prior to fracture of the formation;
   sensing energies of gammas produced by materials in the formation, the sensing by a gamma detector associated with the second logging tool; and
   determining a value indicative of pre-fracture gas saturation;
   wherein creating the value indicative of fracture quality further comprises creating based on the value indicative of pre-fracture gas saturation and the first value indicative of post-fracture gas saturation.

3. The method of claim 2 wherein the first logging tool and the second logging tool are the same logging tool.

4. The method of claim 2 further comprising:
   determining a value indicative of change of fracture quality by:
   releasing neutrons into the formation from a neutron source of a third logging tool, the releasing by the third logging tool more than a week after the releasing by the first logging tool;
   sensing energies of gammas produced by materials in the formation, the sensing by a gamma detector associated with the third logging tool;
   determining a second value indicative of post-fracture gas saturation; and
   creating the value indicative of change of fracture quality based on the value indicative of pre-facture gas saturation, the first value indicative of post-fracture gas saturation, and the second value indicative of post-fracture gas saturation.

5. The method of claim 4 wherein the first logging tool, the second logging tool, and the third logging tool are the same logging tool.

6. The method of claim 2 wherein creating the value indicative of fracture quality further comprises creating based on a ratio of the value indicative of pre-fracture gas saturation and the first value indicative of post-fracture gas saturation.

7. The method of claim 2 wherein creating the value indicative of fracture quality further comprises creating based on a difference between the value indicative of pre-fracture gas saturation and the first value indicative of post-fracture gas saturation.

8. The method of claim 1 further comprising fracturing the formation with treatment materials, and wherein the treatment materials are substantially free of radioactive elements.

9. The method of claim 1 further comprising fracturing the formation with treatment materials, and wherein the treatment materials are substantially free of radiation activated elements.

10. The method of claim 1 wherein releasing neutrons further comprises releasing the neutrons into the formation more than seven days after the formation is fractured.

11. The method of claim 1 wherein releasing neutrons further comprises releasing the neutrons into the formation more than 21 days after the formation is fractured.

12. The method of claim 1 further comprising:
determining a value indicative of change of fracture quality by:
releasing neutrons into the formation from a neutron source of a second logging tool, the releasing by the second logging tool more than a week after the releasing by the first logging tool;
sensing energies of gammas produced by materials in the formation, the sensing by a gamma detector associated with the second logging tool;
determining a second value indicative of post-fracture gas saturation; and
creating the value indicative of change of fracture quality based on the first value indicative of gas saturation and the second value indicative of fracture saturation.

13. A method comprising:
measuring gas saturation of a formation with a neutron-gamma tool to create a value indicative of pre-fracture gas saturation;
fracturing the formation with formation treatment materials;
measuring gas saturation of the formation with a neutron-gamma tool to create a value indicative of post-fracture gas saturation; and
creating a value indicative of fracture quality based on the value indicative of pre-fracture gas saturation and the value indicative of post-fracture gas saturation.

14. The method of claim 13 wherein the neutron-gamma tool used to create the value indicative of pre-fracture gas saturation and the neutron-gamma tool used to create the value indicative of post-fracture gas saturation are the same neutron-gamma tool.

15. The method of claim 13 wherein measuring gas saturation to create the value indicative of post-fracture gas saturation further comprises measuring within seven days of the fracturing.

16. The method of claim 13 wherein measuring gas saturation to create the value indicative of post-fracture gas saturation further comprises measuring seven days or more from the fracturing.

17. The method of claim 13 further comprising:
determining gas saturation of the formation with a neutron gamma tool, the determining gas saturation more than a week after measuring gas saturation to create the value indicative of post-fracture gas saturation, the determining creates a value indicative of change of gas saturation; and
creating a value indicative of change in fracture quality based on the value indicative of pre-fracture gas saturation, the value indicative of post-fracture gas saturation, and the value indicative of change of gas saturation.

18. The method of claim 13 wherein creating the value indicative of fracture quality further comprises creating the value indicative of fracture quality based on a ratio of the value indicative of pre-fracture gas saturation and the value indicative of gas post-fracture gas saturation.

19. The method of claim 13 wherein creating the value indicative of fracture quality further comprises creating the value indicative of fracture quality based on a difference between the value indicative of pre-fracture gas saturation and the value indicative of gas post-fracture gas saturation.

20. The method of claim 13 wherein fracturing the formation further comprises fracturing the where the treatment materials are substantially free of radioactive elements.

21. The method of claim 13 wherein fracturing the formation further comprises fracturing the where the treatment materials are substantially free of radiation activated elements.

22. A non-transitory computer-readable medium storing instructions that, when executed by a processor, cause the processor to:
read a value indicative of pre-fracture gas saturation of an underground formation;
read a first value indicative of post-fracture gas saturation of the underground formation; and
create a value indicative of fracture quality based on the value indicative of pre-fracture gas saturation and the first value indicative of post-fracture gas saturation.

23. The non-transitory computer-readable of claim 22 wherein when the processor reads the first value indicative of post-fracture gas saturation, the program causes the processor to read the first value indicative of post-fracture gas saturation taken within seven days of the fracturing.

24. The non-transitory computer-readable of claim 22 wherein when the processor reads the first value indicative of post-fracture gas saturation, the program causes the processor to read the first value indicative of post-fracture gas saturation taken seven days or more from the fracturing.

25. The non-transitory computer-readable of claim 22 wherein the program further causes the processor to:
read a second value indicative of post-fracture gas saturation, the second value indicative of post-fracture gas saturation taken more than a week after the first value indicative of post-fracture gas saturation is taken; and
create a value indicative of change in fracture quality based on the first value indicative of post-fracture gas saturation, and the second value indicative post-fracture gas saturation.

26. The non-transitory computer-readable of claim 22 wherein when the processor creates, the program causes the processor to create the value indicative of fracture quality based on a ratio of the value indicative of pre-fracture gas saturation and the first value indicative of gas post-fracture gas saturation.

27. The non-transitory computer-readable of claim 22 wherein when the processor creates, the program causes the processor to create the value indicative of fracture quality based on a difference between the value indicative of pre-fracture gas saturation and the first value indicative of gas post-fracture gas saturation.

* * * * *